United States Patent
Rubin et al.

(10) Patent No.: US 7,807,005 B2
(45) Date of Patent: Oct. 5, 2010

(54) FABRICATION PROCESS FOR THERMOPLASTIC COMPOSITE PARTS

(75) Inventors: Alexander M. Rubin, St. Louis, MO (US); James R. Fox, Florissant, MO (US); Randall D. Wilkerson, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 894 days.

(21) Appl. No.: 11/347,122

(22) Filed: Feb. 2, 2006

(65) Prior Publication Data

US 2007/0175571 A1 Aug. 2, 2007

(51) Int. Cl.
*B32B 37/02* (2006.01)

(52) U.S. Cl. .............. 156/200; 156/463; 156/464; 264/241; 264/257; 264/258; 264/259; 264/264; 264/271.1; 425/373; 425/374

(58) Field of Classification Search .............. 156/196, 156/199, 201, 202, 463, 464, 227, 216; 52/837; 264/241, 257, 258, 259, 264, 271.1; 425/373, 425/374

See application file for complete search history.

(56) References Cited

U.S. PATENT DOCUMENTS

| 4,151,031 A | 4/1979 | Goad et al. |
| 4,674,712 A | 6/1987 | Whitener et al. |
| 5,716,487 A | 2/1998 | Sumerak |
| 5,820,804 A * | 10/1998 | Elmaleh ............ 264/167 |
| 6,007,917 A * | 12/1999 | Weigel et al. ............ 428/408 |
| 2002/0135093 A1* | 9/2002 | Davis ............ 264/102 |
| 2003/0044570 A1* | 3/2003 | George et al. ............ 428/105 |
| 2005/0056362 A1* | 3/2005 | Benson et al. ............ 156/163 |

FOREIGN PATENT DOCUMENTS

| BE | 834458 A | 2/1976 |
| DE | 1504302 A | 4/1969 |
| DE | 1629830 A | 1/1971 |
| DE | 2165470 A | 7/1973 |
| DE | 2647821 A | 4/1978 |
| DE | 4017978 C2 | 9/1993 |
| EP | 0024895 A | 3/1981 |
| EP | 0317861 A | 5/1989 |
| EP | 1614624 A1 | 11/2006 |
| GB | 531357 A | 1/1941 |
| GB | 1157239 A | 7/1969 |
| WO | 8302085 A | 6/1983 |

* cited by examiner

*Primary Examiner*—Richard Crispino
*Assistant Examiner*—Christopher Schatz
(74) *Attorney, Agent, or Firm*—Ostrager Chong Flaherty & Broitman P.C.

(57) ABSTRACT

A fabrication method of forming a thermoplastic composite laminate material with tailored and varying thickness in a continuous process. This process utilizes automated equipment or hand lay-up to collate parts or components into a multi-layer stack. Each stack contains all plies, including ply build-up areas, tacked in the proper location to maintain orientation and location. The consolidation tooling contains all necessary part features and is coordinated to the customized multiple ply stacks to form a single integrated thermoplastic composite laminate potentially having areas of differing thickness from these multiple ply stacks.

17 Claims, 3 Drawing Sheets

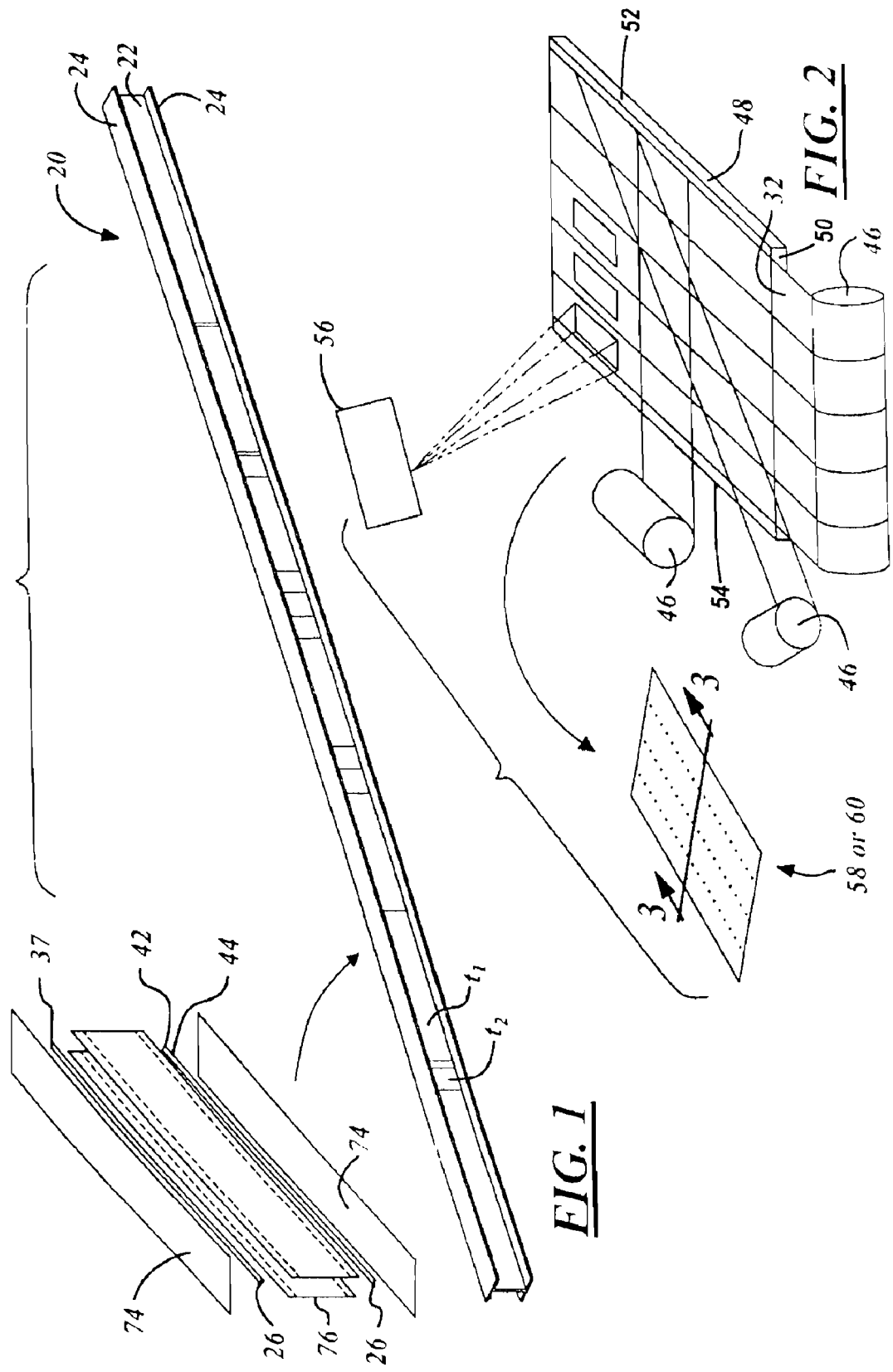

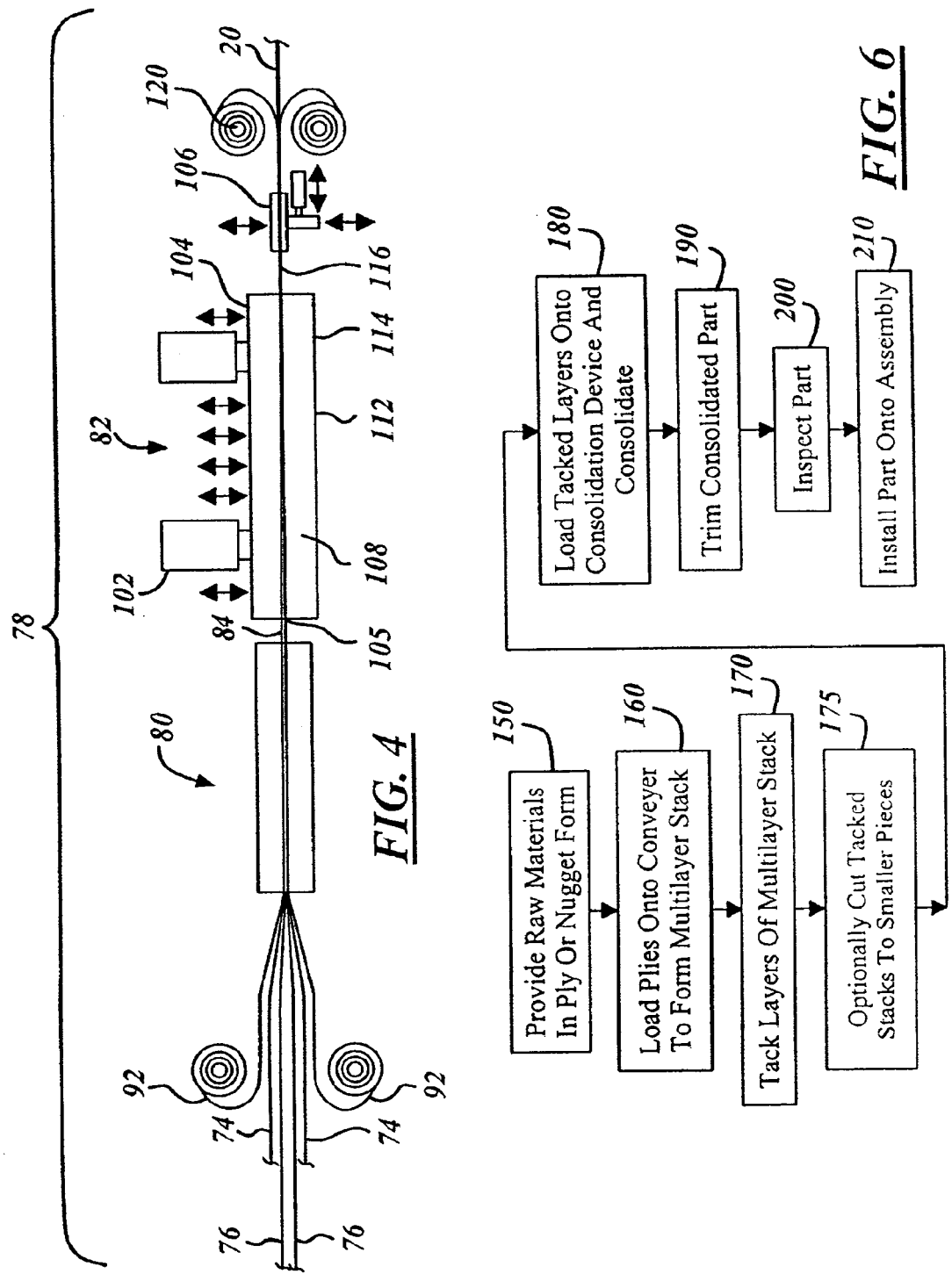

FABRICATION PROCESS FOR THERMOPLASTIC COMPOSITE PARTS

TECHNICAL FIELD

The present disclosure generally relates to fabrication processes of plastic materials and more specifically to a novel fabrication process for a thermoplastic composite parts.

BACKGROUND ART

Numerous processes exist for the fabrication of thermoplastic composite ("TPC") laminates of constant thickness. In addition to non-continuous processes such as pressing, stamping and autoclave forming, there are continuous processes such as extrusion, pultrusion, roll forming, and compression molding. Although these latter processes are capable of producing parts in continuous lengths, they lack the ability to produce parts of varying thickness that are needed for lightweight aerospace structures and other structures where weight is of particular importance.

There thus exists a need to provide a new method that is capable of fabricating complex TPC laminates with tailored thicknesses in a continuous process. Preferably, such a method should be a low-cost method and take advantage of automated equipment where possible.

SUMMARY OF THE DISCLOSURE

The present disclosure provides an innovative method to fabricate complex thermoplastic composite laminates with tailored and varying thicknesses in a continuous process. This innovative process utilizes automated equipment or hand lay-up to collate parts or components into a multi-layer stack. Each stack contains all plies, including ply build-up areas, tacked in the proper location to maintain orientation and location. The consolidation tooling contains all necessary part features and is coordinated to the customized multiple ply stacks to form a single integrated composite laminate potentially having areas of differing thicknesses from these multiple ply stacks.

The composite part formed by the above method may find use in a wide variety of applications, including, for example, automotive and aerospace applications. One example of a composite part formed in accordance with the present disclosure is ideally suited for use as structural stiffening members in a commercial aircraft.

Other features, benefits and advantages of the present disclosure will become apparent from the following description of the disclosure, when viewed in accordance with the attached drawings and appended claims.

BRIEF DESCRIPTION OF THE DRAWINGS

FIG. 1 is an exploded view and perspective view of a thermoplastic composite laminate formed in accordance with a preferred embodiment of the present disclosure;

FIG. 2 is a perspective view of a conveyor table used to form a tailored multiplayer stack;

FIG. 4 is a view of a pre-forming zone and a consolidating zone of a consolidation device used to form the thermoplastic composite laminate of FIG. 1;

FIG. 6 is a logic flow diagram describing the preferred method for forming the thermoplastic composite laminate of FIG. 1 in accordance with FIGS. 2-5.

BEST MODES FOR CARRYING OUT THE INVENTION

Figure 3:
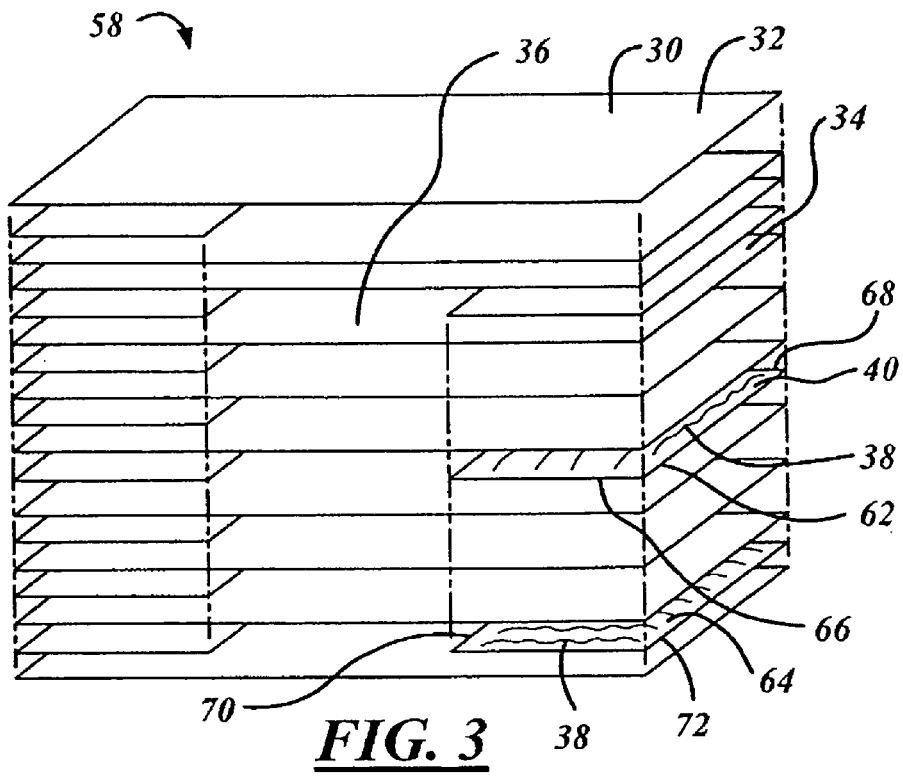
FIG. 3 is a perspective view of one example of a tailored multi-layer stack formed in FIG. 2.

The present disclosure provides a novel fabrication method of forming a thermoplastic composite ("TPC") laminate material with tailored and varying thicknesses in a continuous process. The present disclosure finds applicable uses in a wide variety of potential applications, including for example, in the aerospace industry. The preferred method of the present disclosure is ideally suited for forming thermoplastic composite stiffening members in the supporting framework of a commercial aircraft fuselage. Potential examples of thermoplastic composite stiffening members include but are not limited to fuselage skins, wing skins, door panels, access panels, keel beams, floor beams, and deck beams. For illustrative purposes only, the present disclosure will be described in reference to forming a thermoplastic composite floor beam 20 for use in a commercial aircraft fuselage.

Referring now to FIG. 1, a thermoplastic composite laminate, here a thermoplastic composite laminate floor beam 20 having tailored and varying thickness regions t1 and t2 is illustrated as having a web region 22 coupled at either end to a respective pair of cap regions 24. The web region 22 and pair of cap regions 24 are formed as a single integrated laminate structure by consolidating a pair of non-uniform thickness tacked multi-layer ply sheet stacks 76 with a pair of thermoplastic composite filler nuggets 26 and further with a pair of uniform thickness tacked multi-layer ply sheet stacks 74. It will be understood that cap regions 24, which are shown as having a uniform thickness, may similarly be provided with regions of varying thicknesses.

In alternative versions (not shown), a thermoplastic composite laminate such as the floor beam 20 could alternatively be formed by consolidating one or more uniform or non-uniform tacked multi-layer ply sheets 74, 76 with either one or more single ply (shown as 32 in FIGS. 2 and 3) of a thermoplastic composite material 30, one or more partial ply (shown as 34 in FIG. 3) of a thermoplastic material 30, or one or more uniform or non-uniform thickness tacked multi-layer tacked stacks 74, 76, and any combination thereof, in a similar method to that described herein. Further, one or more filler nuggets 26 may also be used in combination thereof to form further alternative versions of the thermoplastic composite laminate 20. The method for forming the thermoplastic composite floor beam 20 as shown in FIG. 1 is described below in more detail in conjunction with FIGS. 2-6.

The thermoplastic materials 30 used in plies 32, 34 include thermoplastic matrix polymers (shown as 40 in FIG. 3) such as polyetheretherketone ("PEEK"), polyetherketoneketone ("PEKK"), polyphenylsulfone ("PPS"), polyetherimide ("PEI") preferably reinforced with a fibrous component (shown as 38 in FIG. 3) such as glass (s-type or e-type) or carbon fiber. The fibers 38 within each ply 32, 34 of the thermoplastic materials 30 may be oriented in a unidirectional or non-uniform arrangement, depending upon the particular application. As one of ordinary skill recognizes, the relative types, thicknesses, amounts of fibers 38 within the matrix resin 40, as well as the type of matrix resin utilized in each ply 32, 34 may vary greatly, based on numerous factors, including cost and the ultimate desired physical and mechanical properties of the thermoplastic laminate composite 20. Further, the relative orientation of the unidirectional fibers in one ply 32, 34 relative to another ply 32, 34 may also affect the mechanical properties of the thermoplastic composite laminate 20.

The nuggets 26 are preferably formed from a thermoplastic material 37 that is compatible with the thermoplastic material 30 via extrusion or other well-known forming process. Preferably the matrix resin composition 42 of the nuggets 26 is the same as the matrix resin composition 40 of the materials 30. In addition, the filler nuggets 26 may utilize fibers 44 similar to the fibers 38 contained within the thermoplastic material 30.

Referring now to the logic flow diagram (FIG. 6) and the processing diagrams (FIGS. 2-5), the method for forming the TPC laminate floor beam 20 of FIG. 1 begins in Step 150 by providing preformed plies 32, 34 of the thermoplastic materials 36 and preformed filler nuggets 26 each retained on roller 46 or other retention devices.

Next, in Step 160, multiple plies 32, 34 of the thermoplastic materials 36 are stacked in a desired configuration to form either a non-uniform thickness or uniform thickness untacked multi-layer ply sheet stack 58 or 60 using either a hand lay-up or automated process.

In the automated process, as shown in FIGS. 2 and 3, a plurality of plies 32 or 34 of the thermoplastic material 30 are unrolled from rollers 46 onto a conveyor table 48 to form a collated multi-layer non-uniform thickness or uniform thickness multi-layer ply stack 58 or 60. The rollers 46 may be situated at one end 50, or along the sides 52, 54 of the conveyor table 48 to lay respective ply layers 32, 34 at a particular orientation with respect to another adjacent layer 32, 34. Thus, for example, a lower layer of a full ply 32 may be laid having unidirectional fibers 38 extending in one direction, while the next respective upper full ply 32 may have unidirectional fibers 38 laid in another direction (for example, at 45 or 90 degrees relative to the underlying ply 32). A laser projector 56 located above the conveyor table 48 ensures proper location of the local or partial plies 34 and/or pockets 36 relative to the full plies 32.

FIG. 3 shows an example of an untacked, non-uniform thickness multi-layer sheet stack 58 made according to the process of FIG. 2. FIG. 3 shows various full and partial plies 32, 34, including pockets 36 created between plies 32, 34. FIG. 3 also shows partial plies 62, 64 having unidirectional fibers 38 laid in a 90-degree relative orientation with respect to one another, here showing partial ply 62 laid in a first orientation (fibers 38 extending from front 66 to back 68), while partial ply 64 is laid in a different orientation (fibers 38 extending from side 70 to side 72). Of course, while not shown, plies may have fibers 38 at other relative orientations to one another, ranging from perpendicular to one another (i.e. a 0/90 arrangement) to parallel with one another (i.e. a 0/0 arrangement) and every conceivable angle there between (including, for example a 0/30 orientation, a 0/60 orientation etc.).

Next, in Step 170, some or all of various plies 32, 34 of the untacked stacks 58, 60 formed in FIG. 2 are tacked together at various predetermined locations to form either a uniform thickness tacked multi-layer ply sheet stack 74 or a tacked non-uniform thickness multi-layer ply sheet stack 76. Preferably, the stacks 58, 60 are tacked together using a soldering iron or ultrasonic welder to form the respective stack 74, 76, although other devices known to couple together various plies 32, 34 of thermoplastic materials known to those of ordinary skill are also specifically contemplated. The amount and location of tacking among the plies 32, 34 is dependent upon numerous factors, including but not limited to the number and location of the various plies 32, 34 and pockets 64. Moreover, the amount of tacking should be sufficient to form a substantially integrated tacked stack 74, 76 that can be transported as a single part.

In Step 175, the tacked stacks 74, 76 may then be cut into smaller pieces, or are ready for use in forming the thermoplastic composite laminates such as floor beam 20 of FIG. 1.

Next, in Step 180, a combination of at least one uniform or non-uniform thickness tacked stack 74, 76, and at least one of either a non-uniform thickness tacked stack 76, a uniform thickness tacked stack 74, or a single ply 32, and optionally at least one filler nugget 26 of thermoplastic material 30, 37 are fused together in a consolidation device 78 to form a single integrated thermoplastic composite laminate such as a floor beam 20. One preferred consolidation device 78 specifically designed to form the thermoplastic composite laminate floor beam 20 of FIG. 1 is illustrated in FIGS. 4 and 5 below.

Figure 5:
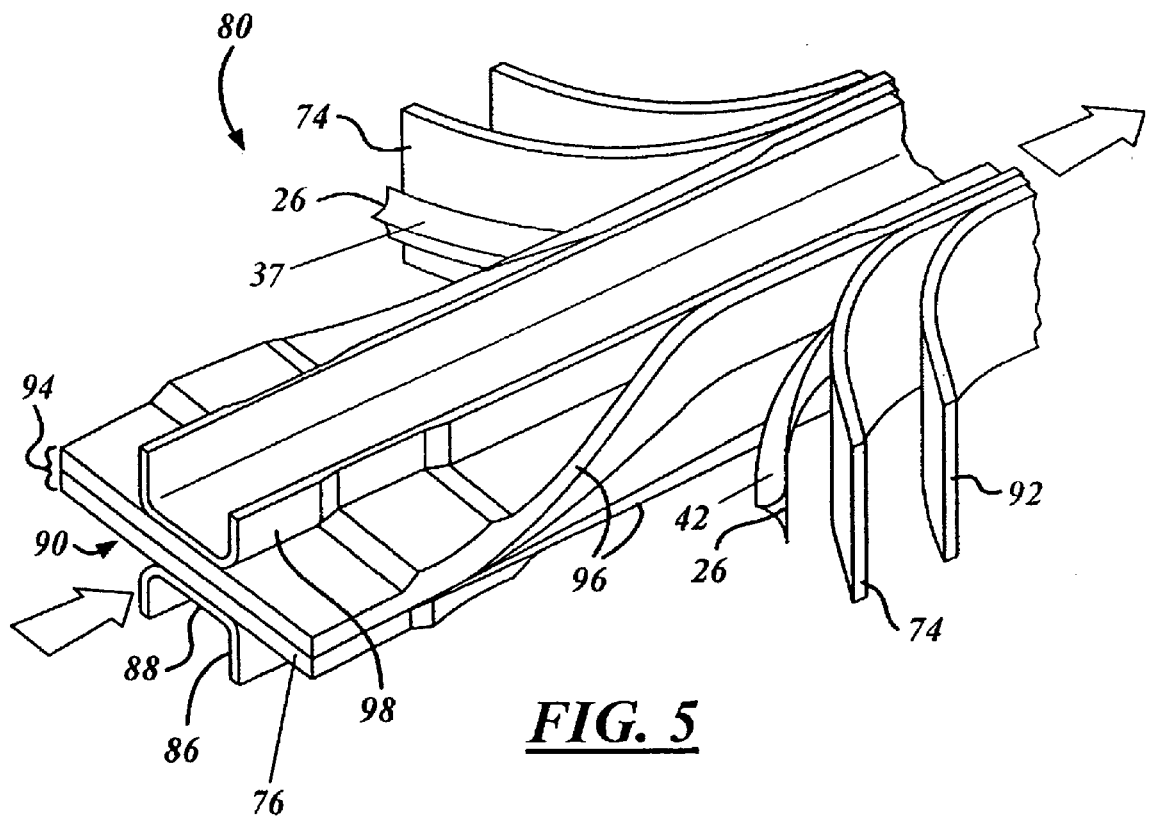
FIG. 5 is a perspective view of the pre-forming zone of the consolidation device of FIG. 4.

Referring now to FIGS. 4 and 5, the consolidation device 78 includes a pre-forming zone 80 and a consolidation zone 82. In the pre-forming zone 80, a combination of at least one uniform or non-uniform thickness tacked stack 74, 76, optionally at least one filler nugget 26, and at least one of either a non-uniform thickness tacked stack 76, a uniform thickness tacked stack 74, or a single ply 32 of thermoplastic material are loaded in their proper orientations in a continuous process and preformed to the desired shape at an elevated temperature to form the preformed part 84. The preformed part 84 then exits the pre-forming zone 80 and enters the consolidation zone 82, wherein it is consolidated to form a single, integrated thermoplastic composite laminate such as the floor beam 20 as described in FIG. 1 above. The elevated temperature described in forming the preformed part is sufficiently high to become rubber-like and allow bending of the layers of the tacked stacks 74, 76 but below a temperature in which the polymeric component of the matrix resin 40, 42 free flows like a viscous liquid.

Referring now to FIG. 5, the pre-forming zone 80 of the consolidation device 78 includes a pair of u-shaped tooling channels 86 having a central portion 88 separated by a gap 90 and a pair of side-tooling sheet members 92, or mandrels 92. Preferably, the channels 86 and side-tooling sheet members 92 are formed of materials such as stainless steel that are capable of handling repetitious, high-heat cycles.

A first pair 94 of tacked stacks 74 or 76 is introduced between the respective central portions 88 and within the gap 90 of the u-shaped channels 86. At the same time, an optional filler nugget 26 and either the additional tacked stack 74 or 76 or ply 32, are introduced along each flange 96 of the first pair 94 and within the respective side-tooling member 92. For the purposes of description in the following paragraphs with respect to the illustrations of FIGS. 4 and 5, the non-uniform thickness tacked stack 76 is shown as the first pair 94 introduced between the gaps 90, while the uniform thickness tacked stacks 74 is shown being introduced at a position between the outer portion 98 of the u-shaped channels 86 and respective side-tooling member 92. Further, the ply layer 32 is not depicted in this description. While not shown, the u-shaped channels 86 may include ramps and other features designed to match the laminate thickness variations (corresponding to t1 and t2 in FIG. 1) of the particular material (here the first pair 94 of non-uniform tacked stacks 76).

As the tacked stacks 74, 76 and nuggets 26 move within the pre-forming zone 80 towards the consolidation zone 82, the flanges 96 of the first pair 94 of non-uniform thickness tacked stacks 76 on either side of the u-shaped channel 86 are bent outwardly under heat and pressure away from each other towards the respective outer portions 98 of the u-shaped channel 86. The flanges 96 are therefore coupled flat against the inner side of the uniform or non-uniform thickness tacked stacks 76, with the nuggets 26 located between the flanges 96 and the respective inner end of the uniform or non-uniform thickness tacked stacks 76. The heat within the pre-forming zone 80 is elevated sufficiently to allow deformation of the flanges 96 of the non-uniform thickness tacked stacks 76, but below the temperature in which the polymeric component of the matrix resin 40, 42 of the respective stacks 74, 76 and nuggets 26 becomes free flowing like a viscous liquid. The initiation of the bending of the flanges 96 is accomplished by the exertion of pressure from the external forming devices such as rollers (not shown) and uniform thickness tacked stack 74 applied by the side-tooling sheet members 92. The preformed part 84 is then ready to move to the consolidation zone 82.

As best shown in FIG. 4, the preformed part 84 enters a separate or connected consolidating device 102 of the consolidation zone 82 on guide roller 105. The consolidating device 102 includes a plurality of standardized tooling dies 104 that are individually mated with the outer surfaces of the u-shaped channels 86 and side-tooling sheet members 92. This commonality of the surfaces between the standardized dies 104 of the consolidating device 102 and the outer surfaces of the channels 86 and sheet members 92 eliminates the need for part-specific, costly matched dies as well as eliminates start up times between different preformed parts having different ply configurations.

The consolidating device 102 has a pulsating device 106 that incrementally moves the preformed part 84 forward within the consolidation zone 82 and away from the pre-forming zone 80. As the part 84 moves forward, the part first enters a heating zone 108 that heats the part to a temperature which allows the free flow of the polymeric component of the matrix resin 40, 42 of the stacks 74, 76 and nuggets 26. Next, the part 84 moves forward to a pressing zone 112, wherein standardized dies 104 are brought down collectively or individually at a predefined force (pressure) sufficient to consolidate (i.e. allow free flow of the matrix resin) the various plies 32, 34 of the tacked stacks 74, 76 and nuggets 26 into its desired shape and thickness, here forming the web region 22 and pair of cap regions 24 of the floor beam 20. See FIG. 1. Each die 104 is formed having a plurality of different temperature zones with insulators. The dies 104 do not actually contact the part 84, but contact the outer surfaces of the u-shaped channels 86 and side-tooling sheet members 92 opposite the part 84, thus the respective inner surfaces of the channels 86, 92 compress against the portion of the part 84. The compression may occur wherein all the dies 104 compress in one independent yet coordinated step. The dies 104 are opened, and the part 84 is advanced within the consolidating zone 102 away from the pre-forming zone 80. The dies 104 are then closed again, therein allowing a portion of the part 84 to be compressed under force within a different temperature zone. The process repeats itself for each temperature zone of the die 104 as the part 84 is incrementally advanced along the guide rollers 105 towards the cooling zone 114.

The deformed and shaped part 84 then enters a cooling zone 114, which is separated from the pressing zone 112, wherein the temperature is brought below the free flowing temperature of the matrix resin 40, 42, therein causing the fused or consolidated part to harden to its ultimate pressed shape 116. The pressed part 116 then exits the consolidating device 102, wherein the side sheet members 92 are re-rolled onto rollers 120 as scrap.

While not shown, the consolidating device 102 may have additional parts or devices that can introduce shapes or features into the pressed shape 116.

One preferred consolidating zone device 102 that may be utilized is the so-called continuous compression molding ("CCM") process as described in German Patent Application Publication No. 4017978, published on Sep. 30, 1993, and herein incorporated as "Appendix A." However, other molding processes known to those of ordinary skill in the art are specifically contemplated by the present disclosure, including but not limited to pultrusion or roll forming.

Next, in Step 190, the pressed part 116 is trimmed or otherwise post-processed to its desired final shape to form the thermoplastic composite laminate 20. In Step 200, the laminate 20 is inspected visually, preferably using ultrasonic non-destructive inspection techniques, or by other means to confirm that the laminate 20 is correctly shaped and does not contain any visual or other defects. After inspection, in Step 210, the laminate 20 such as the thermoplastic composite floor beam 20 may be installed onto its assembly. In the case of the floor beam 20, it is introduced within an aircraft fuselage.

While the present disclosure is described in terms of forming a thermoplastic composite floor beam 20 having essentially an I-beam shape, other potential shapes are specifically contemplated by the present disclosure. This includes thermoplastic composite laminates having an L-shape, a C-shape, a T-shape, or even a flat panel shape in which thickness transitions may occur in any section of the part. These alternatively shaped laminates, or even other forms of the floor beam 20, are formed by consolidating one or more uniform or non-uniform tacked multi-layer ply sheets 74, 76 with either one or more plies 32 of a thermoplastic composite material 30, one or more partial plies 34 of a thermoplastic material 30, or one or more uniform or non-uniform thickness tacked multi-layer tacked stacks 74, 76, and any combination thereof, in a similar method to that described herein. Further, one or more filler nuggets 26 may also be used in combination thereof to form additional alternative versions of the thermoplastic composite laminates 20. To accomplish any of these alternative preferred variations, modifications to the tooling within the pre-forming zone 80 is necessary so as to match the desired thickness variations for the TPC laminate 20. For example, the u-shaped tool 86 of FIG. 5 is specific for forming I-beams such as floor beam 20 of FIG. 1. An alternatively shaped tool 86 having gaps 90 is used in forming C-shaped laminates, L-shaped laminates or flat beams having a taper between respective ply layers. Similar to the u-shaped tool 86, these alternative tools includes regions not contacting the stacks 74, 76 that are matched to the standardized dies 104 within the consolidating zone 102.

In addition, while the present disclosure is ideally used for forming thermoplastic composite laminates, the present disclosure contemplates a similar device, with a modified single-step consolidation zone, could be used to form thermosetting laminate composites. In this type of setup, the heating and pressing zones of the consolidating zone achieve a temperature above the reaction or curing temperature of the matrix resin to form a thermosetting part, and thus the single pressing process achieves a part having its ultimate desired shape without subsequent pressing steps.

Thus, the present disclosure provides an innovative method to fabricate complex thermoplastic composite laminates with tailored and varying thickness in a continuous process. This innovative process utilizes automated equipment or hand lay-up to collate parts or components into a multi-layer stack. Each stack may contain all plies, including ply build-up areas, tacked in the proper location to maintain orientation and location. The consolidation device utilizes a two-stage method for forming the composite laminates from the multilayer stacks and contains all necessary part features to achieve this result. The tooling, such as the u-shaped tool 86, within the pre-forming zone 80 of the consolidation device 78 is created with an appropriate shape to create the desired thickness variations in the formed TPC laminates 20 and is further designed to mate with standardized dies with the consolidation zone 82.

The composite part formed by the above method may find use in a wide variety of applications, including, for example, automotive and aerospace applications. One example of a composite part formed in accordance with the present disclosure is ideally suited for use as structural stiffening members, including thermoplastic composite laminate floor beams 20, in a commercial aircraft.

While the disclosure has been described in terms of preferred embodiments, it will be understood, of course, that the disclosure is not limited thereto since modifications may be made by those skilled in the art, particularly in light of the foregoing teachings.

What is claimed is:

1. A method for manufacturing a thermoplastic composite laminate having tailored and varying thickness in a continuous process, the method comprising steps of:
   making at least one non-uniform thickness multiple ply stack comprising a plurality of stacked plies of a thermoplastic material;
   tacking each of said non-uniform thickness multiple ply stacks to form at least one non-uniform thickness tacked stack;
   providing a pre-forming zone of a consolidation device with a pair of u-shaped channels and a pair of side-tooling members, each of said pair of u-shaped channels having a central portion coupled between a pair of outer portions, a gap being defined between said central portions of said u-shaped channels;
   introducing a pair of said at least one non-uniform thickness tacked stacks within said gap between a pair of u-shaped channels;
   heating said pre-forming zone to a first temperature sufficient to deform said pair of non-uniform tacked stacks but below the free-flowing temperature of a matrix resin component of said plurality of plies of said pair of non-uniform tacked stacks;
   bending each end of one of said pair of non-uniform thickness tacked stacks over a respective outer portion of one of said pair of u-shaped channels;
   bending each end of another of said pair of non-uniform thickness tacked stacks over a respective outer portion of another of said pair of u-shaped channels;
   forming a first material;
   introducing one of said first material between one of said pair of side-tooling members and one of said pair of outer portions of said u-shaped channels, said one of said first material substantially abutting said one end of said pair of non-uniform thickness tacked stacks; and
   introducing a second one of said first material between another of said pair of side-tooling members and another of said pair of outer portions of said u-shaped channels, said second one of said first material substantially abutting said another end of said pair of non-uniform thickness tacked stacks;
   forming a preformed part within said pre-forming zone from said one non-uniform thickness tacked stack and said first material; and
   consolidating said preformed part into a single integrated thermoplastic pressed part within said consolidating zone;
   said pair of non-uniform thickness tacked stacks, said first one of said first material, and said second one of said first material being coupled together to form a preformed part within said pre-forming zone.

2. The method of claim 1 further comprising:
   forming at least one filler nugget of a second thermoplastic material;
   introducing said at least one filler nugget to said consolidation device; and
   forming a preformed part within said pre-forming zone from said one non-uniform thickness tacked stack and said first material and said at least one filler nugget.

3. The method of claim 1, wherein said thermoplastic material includes a thermoplastic matrix resin selected from the group consisting of polyetheretherketone, polyetherketoneketone, polyphenylsulfone, and polyetherimide.

4. The method of claim 3, wherein said thermoplastic material is reinforced with at least one unidirectional fiber contained within said thermoplastic matrix resin, said at least one unidirectional fiber selected from the group consisting of glass fiber and carbon fiber.

5. The method of claim 2, wherein said second thermoplastic material includes a thermoplastic matrix resin selected from the group consisting of polyetheretherketone, polyetherketoneketone, polyphenylsulfone, and polyetherimide.

6. The method of claim 5, wherein said second thermoplastic material is reinforced with at least one fiber contained within said thermoplastic matrix resin, said at least one fiber selected from the group consisting of glass fiber and carbon fiber.

7. The method of claim 1, wherein at least one of said a plurality of plies of a thermoplastic material of said non-uniform thickness multiple ply stack comprises a partial ply.

8. The method of claim 1, wherein at least two of said plurality of plies of a thermoplastic material of said non-uniform thickness multiple ply stack comprises a partial ply, wherein two of said at least two of said partial plies defining a pocket there between.

9. The method of claim 2, wherein the steps of introducing one of said first material to a consolidation device having a pre-forming zone and a consolidating zone, and introducing a second one of said first material comprise:
   introducing one of said first material and one of said filler nuggets between one of said pair of side-tooling members and one of said pair of outer portions of said u-shaped channels such that said one of said filler nuggets is located between one end of said pair of non-uniform thickness tacked stacks and said one of said first material, wherein said one of said first material substantially abuts said one end of said pair of non-uniform thickness tacked stacks; and
   introducing a second one of said first material and a second filler nugget between another of said pair of side-tooling members and another of said pair of outer portions of said u-shaped channels such that said second filler nugget is located between another end of said pair of non-uniform thickness tacked stacks and said second one of said first material, wherein said second one of said first material substantially abuts said another end of said pair of non-uniform thickness tacked stacks;
   wherein said pair of non-uniform thickness tacked stacks, said first one of said first material, said second one of said first material, said first filler nugget, and said second filler nugget are coupled together to form a preformed part within said pre-forming zone.

10. The method of claim 9, wherein the step of consolidating said preformed part into a single integrated thermoplastic pressed part within said consolidating zone further comprises:
introducing said preformed part to a heating zone of said consolidation device;
heating said preformed part to a second temperature above the free-flowing temperature of said matrix resin component of each of said non-uniform thickness tacked stacks, said first one and said second one of said first material, said first filler nugget, and said second filler nugget;
introducing said preformed part heated to said second temperature from said heating zone to a pressing zone, said pressing zone including at least one standardized die;
pressing said preformed part with said pressing die at a pressure sufficient to consolidate said preformed part to form the single integrated thermoplastic pressed part; and
introducing said single integrated thermoplastic pressed part to a cooling zone from said pressing zone to cool said single integrated thermoplastic pressed part below said free-flowing temperature.

11. The method of claim 1, wherein consolidating said preformed part into a single integrated thermoplastic pressed part within said consolidating zone further comprises:
introducing said preformed part to a heating zone of a consolidation device;
heating said preformed part to a second temperature above the free-flowing temperature of said matrix resin component of each of said non-uniform thickness tacked stacks and said first one and said second one of said first material;
introducing said preformed part heated to said second temperature from said heating zone to a pressing zone, said pressing zone including at least one standardized die;
pressing said preformed part with said pressing die at a pressure sufficient to consolidate said preformed part to form the single integrated thermoplastic pressed part; and
introducing said single integrated thermoplastic pressed part to a cooling zone from said pressing zone to cool said single integrated thermoplastic pressed part below said free-flowing temperature.

12. The method of claim 1, wherein the step of providing a pre-forming zone of a consolidation device further comprises
determining a desired part thickness for at least one location of the thermoplastic composite laminate;
providing said pre-forming zone of the consolidation device with said pair of channels and said pair of side-tooling members that incorporates said desired part thickness for said at least one location, each of said pair of channels have a central portion coupled between a pair of outer portions, wherein a gap is defined between said central portions of said channels; said pair of channels and said pair of side-tooling members shaped to substantially match said desired part thickness at each of said at least one locations.

13. The method of claim 12, wherein an outer surface of said pair of channels is designed to substantially match a respective standardized die contained within a consolidating zone of said consolidation device.

14. The method of claim 12, further comprising one or more ramps coupled to at least one of said pair of channels.

15. A method for manufacturing a thermoplastic composite laminate having tailored and varying thickness in a continuous process, the method comprising the steps of:
making at least one multiple ply stack comprising a plurality of stacked plies of a thermoplastic material, said at least one multiple ply stack selected from the group consisting of a non-uniform thickness multiple ply stack and a uniform thickness multiple ply stack;
tacking each of said multiple ply stacks to form at least one tacked multiple ply stack;
providing a pre-forming zone of a consolidation device with a pair of channels and at least one side-tooling member, each of said pair of channels having a central portion coupled between a pair of outer portions, a gap being defined between said central portions of said channels;
introducing at least one of said tacked stacks within said gap between said pair of channels;
forming a first material selected from the group consisting of at least another of said tacked multiple ply stack and at least one ply of a thermoplastic material;
introducing at least one of said first material between one of said at least one side-tooling members and one of said pair of outer portions of said channels, said one of said first material substantially abutting one end of said tacked stack; and
heating said pre-forming zone to a first temperature sufficient to couple said at least one tacked stack to said at least one of said first material to form said preformed part, said first temperature being below the free-flowing temperature of a matrix resin component of said at least one tacked stack at said at least one first material; and
consolidating said preformed part into a single integrated thermoplastic pressed part within said consolidating zone.

16. The method of claim 15, wherein the step of consolidating said preformed part into a single integrated thermoplastic pressed part within said consolidating zone further comprises:
introducing said preformed part to a heating zone of the consolidation device;
heating said preformed part to a second temperature above the free-flowing temperature of said matrix resin component of each of at least one tacked stacks and said at least one first material;
introducing said preformed part heated to said second temperature from said heating zone to a pressing zone, said pressing zone including at least one standardized die;
pressing said preformed part with said pressing die at a pressure sufficient to consolidate said preformed part to form the single integrated thermoplastic pressed part; and
introducing said single integrated thermoplastic pressed part to a cooling zone from said pressing zone to cool said single integrated thermoplastic pressed part below said free-flowing temperature.

17. The method of claim 1, wherein said first material is selected from the group consisting of at least one tacked multiple ply stack and at least one ply of a thermoplastic material; each of said tacked multiple ply stack selected from the group consisting of a non-uniform thickness tacked multilayer ply sheet stack and a uniform thickness tacked multilayer ply sheet stack.

* * * * *